US 6,287,258 B1
Sep. 11, 2001

(54) METHOD AND APPARATUS FOR MEDICAL ULTRASOUND FLASH SUPPRESSION

(75) Inventor: Patrick J. Phillips, Sunnyvale, CA (US)

(73) Assignee: Acuson Corporation, Mountain View, CA (US)

( * ) Notice: Subject to any disclaimer, the term of this patent is extended or adjusted under 35 U.S.C. 154(b) by 0 days.

(21) Appl. No.: 09/413,114

(22) Filed: Oct. 6, 1999

(51) Int. Cl.$^7$ ............................................... A61B 8/00
(52) U.S. Cl. ............................................... 600/437; 600/453
(58) Field of Search ........................ 600/437, 407, 600/441, 443, 447, 453, 454, 455, 456; 73/624; 382/162, 261

(56) References Cited

U.S. PATENT DOCUMENTS

| | | |
|---|---|---|
| 5,152,292 | 10/1992 | Karp . |
| 5,170,792 | 12/1992 | Sturgill et al. . |
| 5,197,477 | 3/1993 | Peterson et al. . |
| 5,327,894 | 7/1994 | Thomas . |
| 5,349,524 | 9/1994 | Daft et al. . |
| 5,349,525 | 9/1994 | Dunki-Jacobs et al. . |
| 5,357,965 | 10/1994 | Hall et al. . |
| 5,445,156 | 8/1995 | Daft et al. . |
| 5,451,961 | 9/1995 | Rubin et al. . |
| 5,487,389 | 1/1996 | Banjanin et al. . |
| 5,494,037 | 2/1996 | Bajanin et al. . |
| 5,524,629 | 6/1996 | Mahony . |
| 5,544,659 | 8/1996 | Banjanin . |
| 5,664,575 | 9/1997 | Banjanin et al. . |
| 5,782,769 | 7/1998 | Hwang et al. . |
| 5,795,297 * | 8/1998 | Daigle .................................. 600/447 |
| 5,860,924 * | 1/1999 | Quistgaard ........................... 600/441 |
| 5,899,864 | 5/1999 | Arenson et al. . |
| 5,910,119 * | 6/1999 | Lin ....................................... 600/455 |
| 6,117,080 * | 9/2000 | Schwartz .............................. 600/443 |

* cited by examiner

Primary Examiner—Marvin M. Lateef
Assistant Examiner—Ali M. Imam
(74) Attorney, Agent, or Firm—Craig A. Summerfield; Brinks Hofer Gilson & Lione

(57) ABSTRACT

An ultrasonic imaging system that reduces image flashes by selectively replacing imaging parameters with corresponding imaging parameters from prior time sequences. Imaging parameters include filtered energy, unfiltered energy, variance, acceleration, velocity, and detected echo magnitude. Imaging parameters in several consecutive time sequences can be replaced with the same prior imaging parameter value until the flash is no longer detected. Spatial averaging can be used to improve detection and suppression of image flashes.

66 Claims, 3 Drawing Sheets

METHOD AND APPARATUS FOR MEDICAL ULTRASOUND FLASH SUPPRESSION

FIELD OF THE INVENTION

The present invention relates generally to suppression of flashes during ultrasonic examination.

BACKGROUND

Ultrasonic imaging generates images of one or both of stationary and moving anatomy. Common modes of diagnostic ultrasound imaging include B-mode or M-mode to generate an anatomical image of internal structures from magnitude detected acoustic echoes. Multiple gate color flow mapping and single gate spectral Doppler modes are used primarily to image blood flow or tissue motion. The displays associated with these motion detection imaging modes may be overlaid on top of B-mode images. B-mode ultrasonic imaging predominantly utilizes grayscale maps that assign different display gray levels to received acoustic signal magnitudes. Colors other than gray can also be used to represent different returned magnitudes. The color flow mapping mode predominantly utilizes color maps to display motion parameters over the B-mode images. Different colors are often assigned to estimated motion parameters such as magnitude, energy, velocity, variance, and spectral magnitudes.

These many imaging modes available on an ultrasound scanner can provide valuable diagnostic information in a short time frame. Improvements to these imaging modes can facilitate shorter exam times, allowing more patients to be examined. Shorter exams enable more exams per day which can generate increased revenue for the equipment owner.

Image flash in these imaging modes can inhibit efficiency in examinations. Image flash results in an abrupt display of a large area of color or gray over the desired viewing area. Color or grayscale flashes prevent accurate analysis of flow dynamics or tissue movement. Flashes are caused by movement of the transducer, patient breathing, the heart beating, peristalsis during digestion, gas moving in the bowels, and other undesired movements near the area of interest. Effective minimization of flash artifacts may eliminate additional manipulation by a user of image display controls during an examination. The frequency of access to many buttons that control different types of signal processing filters, velocity scale settings in motion detection modes, frame rates, and other image quality parameters can be reduced with flash suppression.

Motion detection processing, including color flow processing, minimizes flashes by using higher velocity scales, shorter pulse repetition intervals (PRIs), and clutter filters with broad low frequency spectral suppression bands or stopbands. Other flash suppression techniques that may be used for B-mode or motion processing imaging modes include absolute energy or magnitude threshholding, low velocity threshholding, non-linear energy weighted temporal persistence, and non-adaptive as well as adaptive clutter or wall filtering.

In absolute energy or magnitude threshholding, parameters associated with a measured absolute signal level are not displayed if the absolute signal level exceeds a predefined threshold. This technique may erroneously suppress valid flow or tissue movement that exceeds the threshold. Also, low signal level flash may not be suppressed.

In low velocity threshholding, signal parameters indicative of motion are not displayed if they originate from an area with a velocity below a velocity threshold. This technique fails to eliminate high velocity flashes, such as during color Doppler energy ("CDE") imaging where velocity signals are sometimes aliased for increased sensitivity. Further, valid flow signals with low velocities are removed along with the flash signals.

In non-linear energy weighted temporal persistence, filter coefficients of a persistence filter are weighted as a function of the input energy level. High energy signals result in a reduction of the weight of the filter coefficient while low energy signals result in an increase of the weight of the filter coefficient. High energy signals are minimized, assuming that flash is associated with high energy and that flash is relatively short in duration. This technique fails to eliminate flash, but merely reduces the flash. Further, with this technique, lower energy flashes may not be reduced.

In non-adaptive clutter filtering, a clutter or wall filter with sufficient low frequency stopband rejection eliminates some flash since flash is often composed of low frequency signals. This technique fails to comprehensively suppress flash where the high amplitudes of flash signals exceed the filter's stopband rejection levels. Further, flash signals that have spectral bandwidths greater than the filter's stopband bandwidths are not suppressed.

In adaptive clutter filtering, a clutter or wall filter is applied to the acquired signal as a function of the signal's characteristics. Clutter and possibly flash signals are suppressed by a notch filter determined from the mean frequency, energy, and/or variance estimates of the unfiltered in-phase and quadrature ("I/Q") representation of the acquired signal. Another technique uses a mean frequency estimate of the unfiltered I/Q samples to demodulate the I/Q samples so that the dominant clutter or flash is at the DC level where a clutter filter has the greatest signal rejection. These techniques require the clutter or flash to be estimated accurately and positioned within a stopband of the filter which is not always possible. A third technique applies an Nth order polynomial model to the input I/Q signals and subtracts the model signal from the I/Q signals to help suppress clutter or flash. These adaptive techniques can also fail for the same reasons stated for the non-adaptive clutter filtering techniques.

U.S. Pat. No. 5,152,292 discloses an algorithm that identifies flashes based on the absolute energy and velocity for each location and selectively suppresses the display of the velocity estimate. Locations with a velocity below a threshold and/or energy above a threshold are identified as containing flash. The number of locations containing flash in a frame or along a display line are determined and compared to a rejection level. The locations containing flash are suppressed if the number of flashes exceeds the rejection level. This technique fails to suppress weaker flashes. Also, this technique can suppress signals that represent a desired flow that should not be suppressed. Further, this technique fails to suppress flashes that do not have low velocities. For example, CDE values are often derived from scale settings that produce velocity aliasing and cause the flash to appear at high velocities.

U.S. Pat. No. 5,782,769 discloses an algorithm for suppressing large excursions of a Doppler signal using a min-max and/or max-min filter applied across frames at distinct spatial locations. An N-spatial location sliding window on a single Doppler parameter data stream identifies the minimum value within the window to produce a data stream of minimum values. A second N-spatial location sliding window is applied to the "minimum" data stream to identify a data stream of maximum values. The difference between the current value of the original data stream and this last data stream is compared to a predetermined threshold. When the threshold is exceeded, the value from the last data stream replaces the current value. Otherwise, the original data is not altered. This removes large positive excursions. Large negative excursions can be eliminated by reversing the order of the minimum and maximum identification acts. When the length of the sliding window does not match the underlying flash characteristics, this technique fails to suppress some flash and removes flow signals.

BRIEF SUMMARY

The aforementioned problems are solved by providing a method and apparatus for eliminating or minimizing flashes in medical diagnostic ultrasound imaging by selectively replacing parameters contaminated by a flash with prior uncontaminated parameters. A difference between two like parameter values is compared to a threshold. Where the difference crosses (e.g. are greater than or is less than) the threshold, one or more parameter values are replaced by uncontaminated like parameters from a previous time sequence.

In a first aspect, a medical diagnostic ultrasound method and associated system of suppressing flash signals is provided. Differences are determined between each two consecutive parameter values of a plurality of sequential parameter values representing a spatial location. Each parameter value of the plurality of sequential parameter values represents the spatial location at a different time. The differences are compared to a threshold. When a difference between the first and second parameter values crosses the threshold, one or both of (1) a second parameter value of the plurality of sequential parameter values is replaced with a first parameter value of the plurality of sequential parameter values and (2) a second value of another type of parameter is replaced with a first value of the other type of parameter, the first and second values of the other type of parameter representing the spatial location at different times.

In a second aspect, a medical diagnostic ultrasound method and associated system for suppressing flash signals is provided. A first difference is determined between a first parameter value representing a spatial location and a second parameter value representing the spatial location at a different time. The first difference is compared to a first threshold. When the first difference is greater than the first threshold, one or both of (1) the second parameter value is replaced with the first parameter value and (2) another parameter value representing the spatial location at a same time as the second parameter value is replaced with another parameter value representing the spatial location at a same time as the first parameter value. Parameters that are subsequent to the second parameter are replaced with one or both of (1) the first parameter value and (2) the other parameter value representing the spatial location at the same time as the first parameter value until a difference between two subsequent parameters is less than a second threshold.

In a third aspect, a medical diagnostic ultrasound method and associated system is provided for suppressing flash signals. A first difference is determined between a first parameter value representing a spatial location and a second parameter value representing the spatial location at a different time. The first difference is compared to a first threshold. Another type of parameter value is compared to a second threshold. When the first difference is greater than the first threshold and the third parameter value is one of greater than and less than the second threshold, one of the second parameter value, the third parameter value and another parameter value is replaced.

BRIEF DESCRIPTION OF THE DRAWINGS

The preferred embodiments are described with reference to the accompanying figures. In the figures, like reference numbers indicate identical or functionally similar elements. Additionally, the left-most digit of a reference number identifies the figure in which the reference number first appears.

DETAILED DESCRIPTION OF THE PREFERRED EMBODIMENTS

Figure 1:
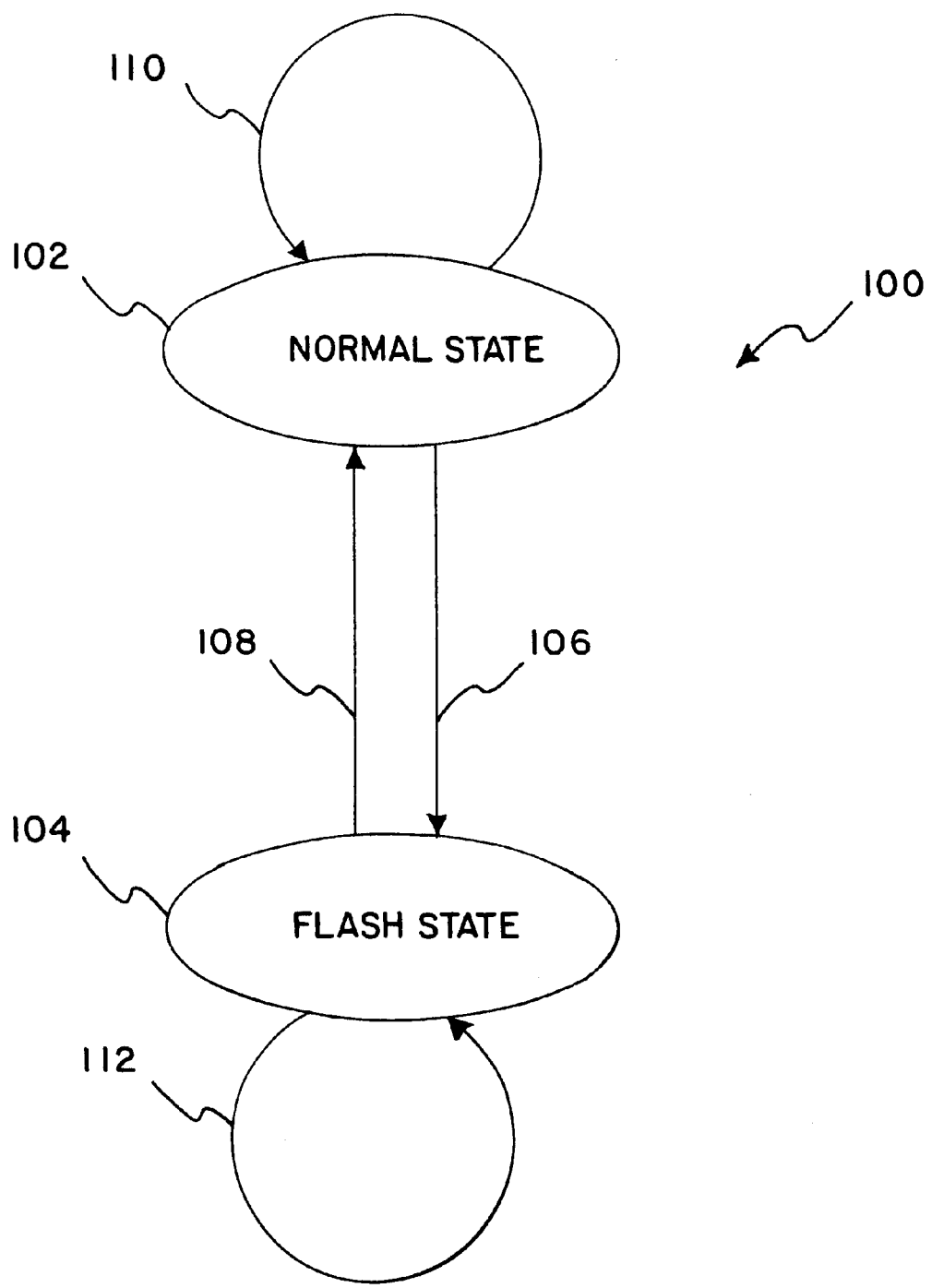
FIG. 1 is a state diagram of the normal and the flash states.

Referring to FIG. 1, an ultrasonic flash suppression method and system for processing a stream of imaging signals has two states and two transitions as shown in the state diagram 100. The states include the normal state 102 and the flash state 104. The system transitions from the normal state 102 to the flash state 104 along transition 106 and from the flash state 104 to the normal state 102 along transition 108. The system stays in the normal state 102 by following transition 110. The system stays in the flash state 104 by following transition 112.

A stream of signals is generated by an ultrasound receiver. The stream of signals includes a plurality of time sequences (e.g. frames, image cells, or lines) that each represent a plurality of spatial locations or spatial locations. The signals are analyzed to determine if they have been corrupted by flash. A "time sequence" comprises data representing a single beam line, a frame of data that includes a plurality of beam lines, an image cell, an image pixel or other groups of data.

Various attributes or parameters are associated with each spatial location. A parameter value comprises a value representing a single pixel, a single voxel, an imaging cell, or other portion of the time sequence such as a combination of multiple pixels, voxels, or image cells averaged in time and/or space. A parameter value in a previous or subsequent time sequence (e.g. frame) that represents the same position in a scanned region is a corresponding parameter value as used herein. Parameter values include data representing motion, such as velocity, variance, acceleration and/or energy, or reflected intensity representing moving or stationary tissue or fluid.

When the system detects no flash at a spatial location, the system is in the normal state 102. When the system is in the normal state 102, the stream of signals bypasses or is not affected by the flash suppression components of the system. The parameter values are analyzed in each time sequence for flash contamination. Several techniques, described below, can be used to determine the existence of flash.

When the system detects flash at a spatial location, the system is in the flash state 104. When the system is in the flash state, at least one parameter associated with the spatial location in the current time sequence is replaced by a corresponding previous parameter determined not to be in the flash state. If during time period "n" parameter $P1_n$ is determined to be in the flash state, that parameter is replaced with $P1_{n-1}$. Here, n−1 corresponds to the time sequence immediately previous to the time sequence n. If $P1_{n-1}$ was also in the flash state, than an earlier version of the parameter P1 is used. For example, the parameter $P1_{n-2}$ replaces both $P1_{n-1}$ and $P1_n$.

Alternatively, if flash is detected in a first parameter value, for example $P1_n$, a second parameter value, for example $P2_n$, may be replaced with $P2_{n-1}$. The second parameter may be replaced independently of or in conjunction with the replacement of the first parameter. For example, if flash is detected because a derived energy parameter is above a first energy threshold, the energy level and the velocity may be replaced with previous energy and velocity data, respectively.

The threshold is a greater-than threshold or a less-than threshold. A greater-than threshold is crossed if the previous parameter is less-than the threshold and the current parameter is greater-than the threshold. Likewise, a less-than threshold is crossed if the previous parameter is greater-than the threshold and the current parameter is less-than the threshold. A threshold can be a dynamic threshold (e.g., change over time or correlate to other parameters). For example, a threshold changes as a function of the system gain levels or with dynamically measured signal-to-noise ratio values.

The time sequence of signals can include one or more of the following parameters for each spatial location at a given time:

$E_n$=filtered energy, detected amplitude, or signal magnitude at time sequence n;

$UE_n$=unfiltered energy or unfiltered magnitude from the sequence n;

$VAR_n$=variance at the sequence n; and $|v|_n$=absolute value of the velocity at time sequence n;

Where "i" and "j" are indices and other parameters may be used that represent a characteristic of reflected energy. "Filtered" refers to low pass, high pass, or bandpass filtering of samples from two or more time sequences. For example, a highpass filter includes conventional clutter or wall filters used in color flow mapping or Doppler motion detection processing for suppressing low frequency signals. These filters may also be used for B-mode imaging. A bandpass filter may include a filter used to suppress fundamental and second harmonic clutter signals generated from an alternating polarity or other pulsed transmit sequence while imaging as a function of second harmonic energy from tissue or contrast agents. A lowpass filter may include a filter used to suppress fundamental signal energy generated from the same alternating polarity or other pulsing sequence for harmonic imaging. A lowpass filter may also be used to suppress high frequency signal content between parameter values in adjacent time sequences. Examples of such filters are described in U.S. patent application Ser. No. 09/282,902, now U.S. Pat. No. 6,210,334 to Patrick Phillips.

Flash is detected using one or more of various methods. By way of example, transition 106 from the normal state 102 to the flash state 104 occurs when one or more of the following equations, e.g., 1–11, becomes true for a parameter value or a group of parameter values from at least two time sequences.

$$(E_n - E_{n-1}) > E_{th,\,1} \quad (1)$$

$$((E_n - E_{n-1}) > E_{th,\,1}) \text{ and } (UE_n > UE_{th,\,1}) \quad (2)$$

$$((E_n - E_{n-1}) > E_{th,\,1}) \text{ and } (VAR_n < VAR_{th,\,1}) \quad (3)$$

$$((E_n - E_{n-1}) > E_{th,\,1}) \text{ and } (VAR_n < VAR_{th,\,1}) \text{ and } (|v|_n < V_{th,\,1}) \quad (4)$$

$$((E_n - E_{n-1}) > E_{th,\,1}) \text{ and } (P_i < P_{th,\,i}) \text{ and } (P_j > P_{th,\,j}) \quad (5)$$

$$((E_n - E_{n-1}) > E_{th,\,1}) \text{ and } (P_i < P_{th,\,i}) \quad (6)$$

$$((E_n - E_{n-1}) > E_{th,\,1}) \text{ and } (P_j > P_{th,\,j}) \quad (7)$$

$$(UE_n - UE_{n-1}) > UE_{th,\,1} \quad (8)$$

$$((UE_n - UE_{n-1}) > UE_{th,\,1}) \text{ and } (P_i < P_{th,\,i}) \text{ and } (P_j > P_{th,\,j}) \quad (9)$$

$$((UE_n - UE_{n-1}) > UE_{th,\,1}) \text{ and } (P_i < P_{th,\,i}) \quad (10)$$

$$((UE_n - UE_{n-1}) > UE_{th,\,1}) \text{ and } (P_j > P_{th,\,j}) \quad (11)$$

where $E_{th,\,i}$=$i^{th}$ filtered energy threshold;

$UE_{th,\,i}$=unfiltered energy threshold;

$VAR_{th,\,i}$=$i^{th}$ variance threshold;

$V_{th,\,i}$=$i^{th}$ velocity magnitude (speed) threshold $P_i$, $P_j$=$i^{th}$ parameter including but not limited to a parameter identified herein; $P_j$=$j^{th}$ parameter including but not limited to a parameter identified herein;

$P_{th,\,i}$=threshold for the ith parameter.

Which equation to use is determined by experimentation, application specific criteria, or other criteria. For example, equation (3) may effectively detect flash occurring during an examination of perfusion in a kidney. If the filtered energy jumps by more than 6 dB between two time sequences and the variance is one-tenth of the maximum possible variance, the current parameter values may be contaminated by flash and are replaced. As another example, equation (4) may effectively detect flash occurring during a carotid examination. A velocity magnitude less than an eighth of the maximum possible may further help identify flash. Other threshold values, numbers of time sequences, and equations using the same or different parameter values and combinations thereof may be used.

These equations are used individually or in combination. When used in combination, the transition occurs if at least one of the equations is true.

In an embodiment as illustrated by equation (1), the transition 106 from the normal state 102 to the flash state 104 occurs when the difference in filtered energy levels between signals of the current time sequence and the previous time sequence for a spatial location exceeds a filtered energy threshold.

In an embodiment as illustrated by equation (2), the transition 106 from the normal state 102 to the flash state 104 occurs when the difference in filtered energy levels between signals of the current time sequence and the previous time sequence for a spatial location exceeds a filtered energy threshold and the unfiltered energy exceeds an unfiltered energy threshold. The unfiltered energy criteria is useful since flash originating from bright or strongly scattering tissue has been observed in practice.

In an embodiment as illustrated by equation (3), the transition 106 from the normal state 102 to the flash state 104 occurs when the difference in filtered energy levels between signals of the current time sequence and the previous time sequence for a spatial location exceeds a filtered energy threshold and the variance is less than a variance threshold. The variance criteria is useful since flash exhibiting low variance has been observed in practice.

In an embodiment as illustrated by equation (4), the transition 106 from the normal state 102 to the flash state 104 occurs when the difference in filtered energy levels between signals of the current time sequence and the previous time sequence for a spatial location exceeds a filtered energy threshold, the variance is less than a variance threshold, and the absolute value of the velocity is less than a velocity threshold. The velocity criteria is useful since some types of flash having predominantly low velocity have been observed in practice.

In an embodiment as illustrated by equation (5), the transition 106 from the normal state 102 to the flash state 104 occurs when the difference in filtered energy levels between signals of the current time sequence and the previous time sequence for a spatial location exceeds a filtered energy threshold, at least one other parameter is less than a corresponding threshold, and at least one other different parameter is greater than a corresponding threshold.

In an embodiment as illustrated by equation (6), the transition 106 from the normal state 102 to the flash state 104 occurs when the difference in filtered energy levels between signals of the current time sequence and the previous time sequence for a spatial location exceeds a filtered energy threshold and at least one other parameter is less than a corresponding threshold.

In an embodiment as illustrated by equation (7), the transition 106 from the normal state 102 to the flash state 104 occurs when the difference in filtered energy levels between signals of the current time sequence and the previous time sequence for a spatial location exceeds a filtered energy threshold and at least one other parameter is greater than a corresponding threshold.

In an embodiment as illustrated by equation (8), the transition 106 from the normal state 102 to the flash state 104 occurs when the difference in unfiltered energy levels between signals of the current time sequence and the previous time sequence for a spatial location exceeds a unfiltered energy threshold.

In an embodiment as illustrated by equation (9), the transition 106 from the normal state 102 to the flash state 104 occurs when the difference in unfiltered energy levels between signals of the current time sequence and the previous time sequence for a spatial location exceeds a unfiltered energy threshold, at least one other parameter is less than a corresponding threshold, and at least one other different parameter is greater than a corresponding threshold.

In an embodiment as illustrated by equation (10), the transition 106 from the normal state 102 to the flash state 104 occurs when the difference in unfiltered energy levels between signals of the current time sequence and the previous time sequence for a spatial location exceeds an unfiltered energy threshold and at least one other parameter is less than a corresponding threshold.

In an embodiment as illustrated by equation (11), the transition 106 from the normal state 102 to the flash state 104 occurs when the difference in unfiltered energy levels between signals of the current time sequence and the previous time sequence for a spatial location exceeds an unfiltered energy threshold and at least one other parameter is greater than a corresponding threshold.

In alternative embodiments, parameters other than filtered or unfiltered energy are used. Different functions or relationships between parameters and/or three or more time sequences may also be used.

The transition 108 from the flash state 104 to the normal state 102 can be detected in many ways. For example, the transition 108 may be indicated when one of the equations discussed above becomes untrue or, preferably, one of the following equations becomes true for data representing a spatial location in a time sequence:

$$(E_n - E_{n-1}) < E_{th,\ 2} \tag{12}$$

$$UE_n < UE_{th,\ 2} \tag{13}$$

$$(UE_n - UE_{n-1}) < UE_{th,\ 3} \tag{14}$$

$$VAR_n > VAR_{th,\ 2} \tag{15}$$

$$|v|_n > V_{th,\ 2} \tag{16}$$

$$P_n > P_{th,\ i} \tag{17}$$

$$P_n < P_{th,\ j} \tag{18}$$

$$N > N_{th} \tag{19}$$

where

N=number of consecutive time sequences corrupted by flash;

$N_{th}$=threshold number of consecutive time sequences corrupted by flash.

The selection of the appropriate equation or equations for use is determined by experimentation, application specific criteria, or other criteria. For example, equation (12) may effectively detect a flash that has subsided since the filtered energy has returned to a normal state. For another example, equation (15) may effectively detect that flash has dissipated during an examination of perfusion in a kidney when a large variance, indicative of flow, is detected. Equation (16) may effectively detect that flashes have dissipated during a carotid examination since flash is typically not of high velocity when velocity scales are chosen to avoid aliasing.

In an embodiment as illustrated by equations (12) and (14), the transition 108 from the flash state 104 to the normal state 102 occurs when the difference in energy level between the current time sequence and the previous time sequence for a spatial location is less than a second energy threshold.

In an embodiment as illustrated by equation (13), the transition 108 from the flash state 104 to the normal state 102 occurs when an unfiltered energy level is less than a second unfiltered energy threshold.

In an embodiment as illustrated by equation (15), the transition 108 from the flash state 104 to the normal state 102 occurs when the variance exceeds a second variance threshold.

In an embodiment as illustrated by equation (16), the transition 108 from the flash state 104 to the normal state 102 occurs when the absolute value of the velocity exceeds a second velocity threshold.

In an embodiment as illustrated by equation (17), the transition 108 from the flash state 104 to the normal state 102 occurs when a parameter exceeds a corresponding second threshold.

In an embodiment as illustrated by equation (18), the transition 108 from the flash state 104 to the normal state 102 occurs when a parameter is less than a corresponding second threshold.

In an embodiment as illustrated by equation (19), the transition 108 from the flash state 104 to the normal state 102 occurs when the number of consecutive time sequences corrupted by flash exceeds a time-out threshold. This transition prevents the system from remaining in the flash state for a prolonged period of time.

Equations 12–19 can be used individually or in combination. For example, if equation (12) and equation (19) are used together, then the transition 108 occurs when either the difference in energy level between the current time sequence and the previous time sequence for a spatial location is less than a second energy threshold or the number of consecutive flash time sequences exceeds the time-out threshold.

Spatial processing of the stream of imaging signals is used to increase the robustness of the process 100 and reduce the probability of replacing valid data. A frame's data is convolved with a spatial filtering kernel. Spatial correlation of flash tends to be greater than spatial correlation of valid data, such as data representing flow. The amount of spatial averaging may vary with scan depth, frequency, angle, or other scanning parameters. For example, a larger spatial kernel may produce superior results when the signal-to-noise ratio ("SNR") is poor. The SNR is poor at a transducer's penetration limit. The process 100 can also be dynamically varied for data representing regions within a time sequence (e.g. a line or a frame) by adjusting the size of the kernel. A large spatial kernel can be used to accumulate all spatial locations in an entire frame. When spatial averaging is used, the spatial locations in the smoothed frame are used in the process 100 instead of the original frame of data.

Independently, the parameter(s) to be displayed, which may or may not include the parameter(s) used to identify a transition into the flash state, can be spatially and/or temporarily averaged. This provides for flash suppression state machine control signals that are independent of the amount of temporal or/and spatial smoothing used in the final image.

Figure 2:
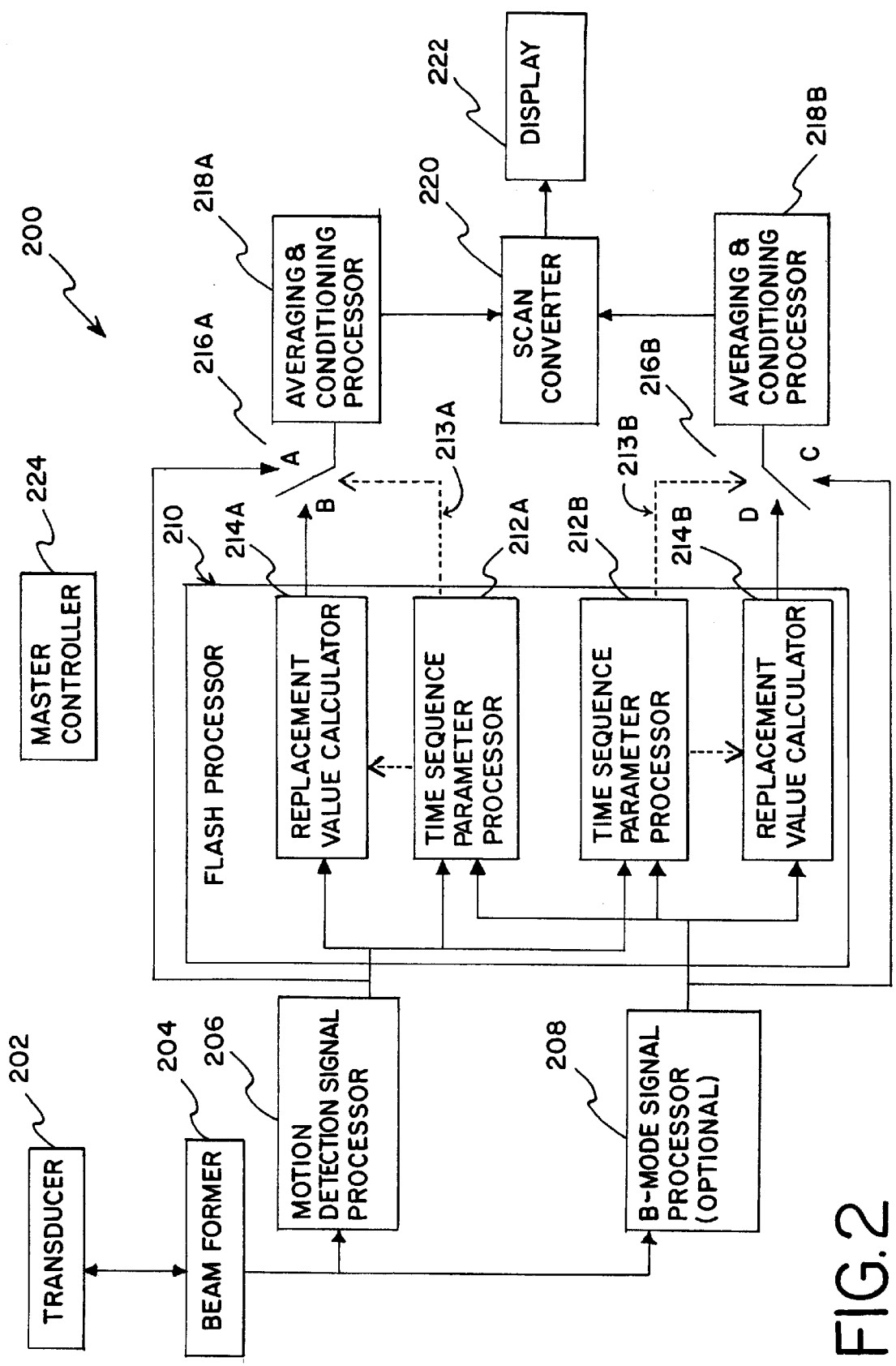
FIG. 2 is a schematic diagram of an embodiment of a medical diagnostic ultrasound system with flash suppression where solid lines indicate signal paths and dashed lines indicate control signal paths.

Referring to FIG. 2, a medical diagnostic ultrasound imaging system 200 is shown that implements the flash suppression process 100. The system 200 receives ultrasonic energy at a transducer 202 and displays an image with flashes suppressed on a display 222. A master controller 224 controls each processing block shown. The signal used in suppressing flash is the signal as received by the medical diagnostic ultrasound imaging system 200, the signal altered to various forms from processing in the system 200, or the final signal used for generating the image.

The ultrasonic energy is converted to an electrical signal by the transducer 202 and sent to a beamformer 204. The beamformer 204 outputs a signal to a motion detection signal processor 206 and a B-mode signal processor 208. Optionally, the processors 206 and 208 have separate independent beamformers. The motion detection signal processor 206 outputs a signal to a flash processor 210 and to node A of a switch 216a. The B-mode signal processor 208 outputs a signal to the flash processor 210 and to node C of a switch 216b. The flash processor 210 includes two time sequence parameter processors 212A and 212B and two replacement value calculators 214A and 214B. Each time sequence parameter processor 212A–212B outputs a signal to the respective replacement value calculator 214A and 214B. Also, the time sequence parameter processors 212A and 212B output a motion detection switch control signal on a line 213A to the switch 216A and a B-mode switch control signal on a line 213B to the switch 216B. The replacement value calculators 214A and 214B output a motion detected signal to node B of the switch 216A and a B-mode signal to node D of the switch 216B. The components, including the switches 216A and 216B and the parameter processors 212A and 212B, include one or more or combinations of a general processor, a digital signal processor, dedicated hardware, multiplexers, ASIC's and other digital or analog hardware.

The motion detection signal processor 206 generates parameters representing motion in time sequences. For example, the processor 206 uses algorithms to generate spectral estimates of motion such as the mean velocity, energy, variance, acceleration, or other descriptive parameter. The motion detection algorithm includes autocorrelation, mean velocity and variance estimators. The processor 206 may alternatively use a cross correlation motion estimator or other motion detection estimators, including estimators based on the fast Fourier transform ("FFT"). Further, one or more parameters may be calculated simultaneously. The processor 206 may include clutter filtering that suppresses deleterious clutter like stationary tissue or vessel wall motion. The processor 206 may include thresholding algorithms that selectively null parameter estimates.

The B-mode signal processor 208 generates time sequences of amplitude, envelope or power detected signals. This processor 208 may also include a filter for generating time sequences of tissue or contrast agent data at the second harmonic of the fundamental transmit frequency. In one particular embodiment, combinations of signals received after transmitting alternating polarity pulses are generated within the processor 208. The addition of data responsive to two or more opposite polarity pulses is of clinical interest since second harmonic, high axial detail resolution images are obtained without significant corruption by fundamental signals. The suppression of flash artifacts that may arise from inadequate fundamental signal suppression due to motion between pulse transmissions is improved. This type of harmonic filtering can also be performed in the processor 206.

Parameters that may be generated by the motion detection signal processor 206 and the B-mode signal processor 208 include, but are not limited to, those used in the equations 1–19. An unfiltered energy or magnitude parameter originates from either the motion detection signal processor 206 or the B-mode signal processor 208 while the filtered energy, variance, and velocity magnitude originates from the motion detection signal processor 206.

The time sequence parameter processors 212A and 212B include a memory, an optional averaging unit, and a state machine (see FIG. 1). Each processor 212A and 212B uses one or more of equations 1–19 to identify parameter values corrupted by flash as well as parameter valves that are free of flash.

Two control signals are output by processors 212A and 212B. The control signals provided to the replacement value calculators 214A and 214B determine the type of parameter averaging applied to generate replacement parameters and control when previous replacement parameter(s) should be held for use during the current time sequence. This hold signal is active when a flash state exists for more than one time sequence for any spatial location over consecutive time intervals. The other control signals output on the lines 213A and 213B are provided to selection switches 216A and 216B, respectively, and select the current parameter(s) or replacement parameter(s). If the state as determined by the processor 212A and 212B is the normal state, the switches 216A and 216B connect to nodes A and C, respectively. The B-mode and motion signal parameter(s) from the current time sequences are passed to the averaging and conditioning processors 218A and 218B. If the state is identified as the flash state, the switches 216A and 216B connect to nodes B and D, respectively. The replacement value parameters from a previous time sequence replace the parameter(s) of the current time sequence. The motion detected signal path shown predominantly in the upper half of FIG. 2 and the B-mode signal path shown predominantly in the lower half of FIG. 2 are independent, although signals from each signal processor 206, 208 may be used in the decision processes within the state machine 100. Further, the state machine operation and the acts outlined above are completed independently for each spatial location within a defined time sequence.

The replacement value calculators 214A and 214B generate replacement value parameter(s) as indicated by the time sequences parameter processors 212A, 212B and/or the master controller 224. The calculators 214A and 214B optionally average like parameters in space and/or time and hold a parameter(s) if instructed by the respective time sequence parameter processor 212A and 212B. For example, if two consecutive time sequences are corrupted by flash, the replacement value calculators 214A and 214B hold the parameters during both time sequences, thus replacing both sequence's current parameter(s) with the same parameter(s).

The aforementioned components of the flash processor 210 and the switches are part of a preferred embodiment and can be implemented using hardware or software.

The processing elements which follow the switches 216A and 216B includes averaging and conditioning processors 218A and 218B, a scan converter 220, and a display 222. These system components are common to most ultrasound scanners and well known. The averaging and conditioning processors 218A and 218B may provide further temporal and/or spatial averaging of parameter(s) and may adjust signal dynamic ranges and gains for proper display dynamic ranges. In alternative embodiments, the ordering of the components shown in FIG. 2 may be rearranged in a different order. For example, the flash processor 210 is implemented after individual scan conversion of B-mode and motion detected signals.

Figure 3:
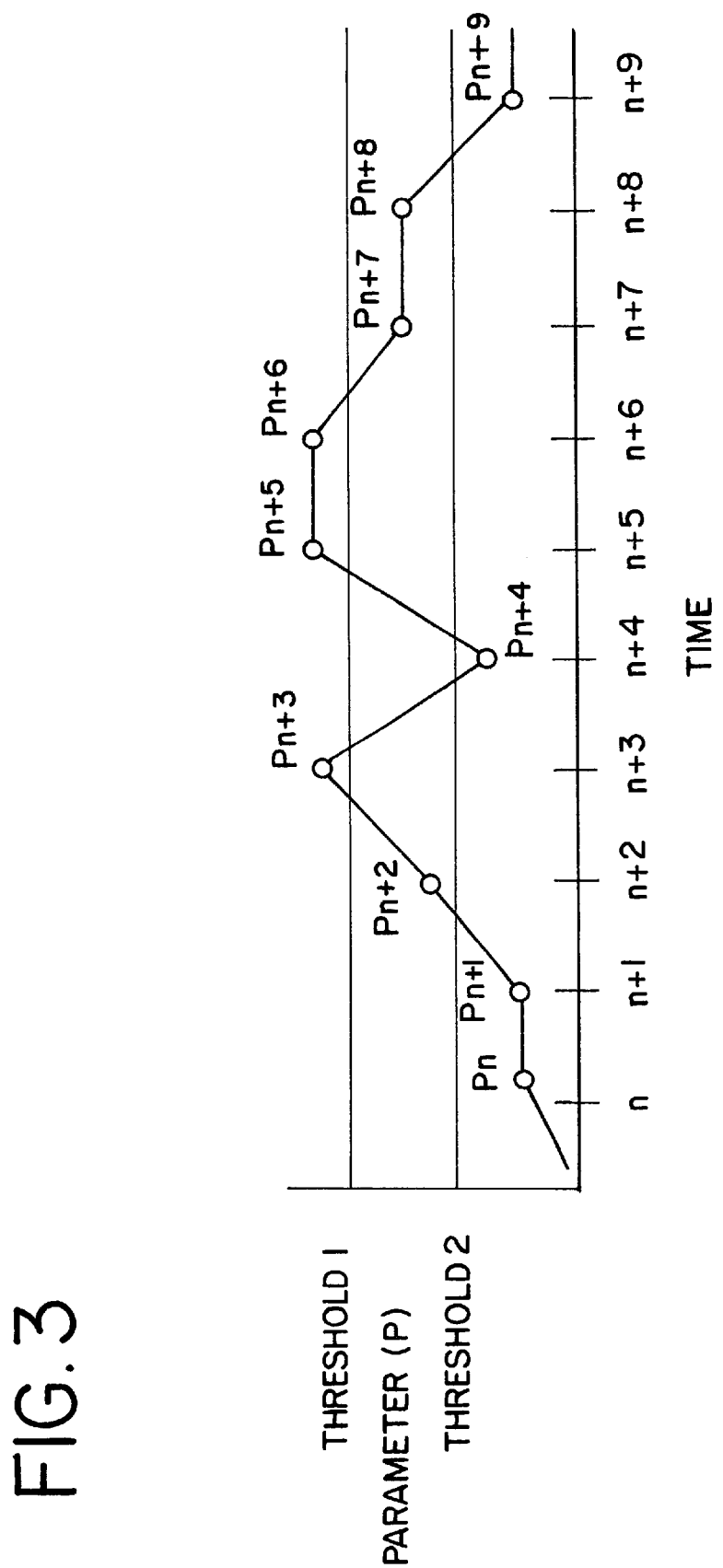
FIG. 3 is an chart of parameter values used to describe an embodiment of the system of FIG. 2.

FIG. 3 represents a set of parameter values (P) for a same point or spatial location as a function of time from different time sequences. For example, the parameter value (P) is associated with a filtered or unfiltered energy parameter. The system 200 (FIG. 2) is in the normal state 102 (FIG. 1) during time intervals n through n+2 because $P_n$ through $P_{n+2}$ are not greater than Threshold 1. For example, parameter value (P) (FIG. 3) represents the difference in filtered energy $(E_n-E_{n-1})$ of equation 1 or the difference in unfiltered energy $(UE_n-UE_{n-1})$ of equation 8. The system 200 enters the flash state 104 (FIG. 1) at time interval n+3 because $P_{n+3}$ is greater than Threshold 1. While in the flash state 104, the system 200 uses parameter data from time interval n+2 to replace the corresponding parameter data for that spatial location (e.g. velocity, variance, and/or energy data, etc.) As described above, the selection of which parameter data are replaced in the flash state 104 is application specific. The system 200 returns to the normal state 102 at time interval n+4 because $P_{n+4}$ is less than Threshold 2. For example, parameter value (P) (FIG. 3) represents the difference in filtered energy $(E_n-E_{n-1})$ of equation 12 or the difference in unfiltered energy $(UE_n-UE_{n-1})$ of equation 14. At the time n+4, parameter value(s) from the time n+4 are maintained. The system 200 enters the flash state 104 at time interval n+5 because $P_{n+5}$ is greater than the first threshold. While in the flash state 104, the system 200 uses parameter data from time interval n+4 to replace the corresponding parameter data. The system 200 remains in the flash state until $P_{n+9}$, using the parameter value(s) from n+4 throughout the times n+5 through n+8. The system 200 returns to the normal state 102 at time interval n+9, because $P_{n+9}$ is less than the Threshold 2. The replacement and replaced values represent the same spatial location at different times. The above example is one embodiment. Other embodiments can be generated with increased sophistication or application of specific criteria as previously explained.

While preferred embodiments have been shown and described, it will be understood that they are not intended to limit the disclosure, but rather it is intended to cover all modifications and alternative methods and apparatuses falling within the spirit and scope of the invention as defined in the appended claims or their equivalents.

What is claimed is:

1. A medical diagnostic ultrasound method of suppressing flash signals, the method comprising the acts of:
   (a) determining differences between each two consecutive parameter values of a plurality of sequential parameter values representing a spatial location, each parameter value of the plurality of sequential parameter values representing the spatial location at a different time; and
   (b) replacing at least one of (1) a second parameter value of the plurality of sequential parameter values with a first parameter value of the plurality of sequential parameter values and (2) a second value of another type of parameter with a first value of the other type of parameter, the first and second values of the other type of parameter representing the spatial location at different times, when a difference between the first and second parameter values crosses a threshold.

2. The method of claim 1 wherein the plurality of sequential parameter values comprise filtered energy values.

3. The method of claim 1 wherein the plurality of sequential parameter values comprise unfiltered energy values.

4. The method of claim 1 further comprising:
   (c) comparing a second type of parameter value representing the spatial location to a second threshold;
   wherein act (b) occurs when the second type of parameter value is one of greater than and less than the second threshold.

5. The method of claim 4 wherein the first and second parameter values comprise a first type of energy values and the second type of parameter comprises a second, different type of energy, act (b) occurring when the second type of energy is greater than the second threshold.

6. The method of claim 4 wherein the first and second parameter values comprise energy values and the second type of parameter comprises a variance parameter, act (b) occurring when the variance parameter is less than the second threshold.

7. The method of claim 4 wherein the first and second parameter values comprise energy values and the second type of parameter comprises a velocity parameter, act (b) occurring when the velocity parameter is less than the second threshold.

8. The method of claim 4 further comprising:
   (d) comparing a third type of parameter representing the spatial location to a third threshold;
   wherein act (b) occurs when the third type of parameter is one of greater than and less than the third threshold.

9. The method of claim 1 wherein act (b) comprises replacing both the second parameter value and the second value of the other type of parameter when the difference crosses the threshold.

10. The method of claim 1 further comprising:
    (c) determining a second difference between the second parameter value and a third parameter value of the plurality of sequential parameter values;
    (d) comparing the second difference to the threshold; and
    (e) replacing the third parameter with the second parameter when the second difference is greater than the threshold.

11. The method of claim 1 further comprising:
    (c) replacing parameter values subsequent to the second parameter value with the first parameter value until a difference between two subsequent parameter values is less than a second threshold.

12. The method of claim 1 further comprising:
(c) replacing parameter values subsequent to the second parameter value with the first parameter until a number, N, of consecutive parameter values have been replaced.

13. The method of claim 1 wherein the plurality of sequential parameter values comprise B-mode intensities.

14. The method of claim 1 wherein act (b) comprises replacing the second parameter value with the first parameter value.

15. The method of claim 14 wherein the plurality of sequential parameter values comprise energy values.

16. The method of claim 1 wherein act (b) comprises replacing the first value of the other type of parameter with the second value of the other type of parameter.

17. The method of claim 16 wherein the plurality of sequential parameter values comprise energy values and the other type of parameter comprise velocity.

18. The method of claim 1 further comprising:
(e) replacing parameter values subsequent to the second parameter value with the first parameter value until a subsequent parameter is one of less that and greater than a second threshold.

19. A medical diagnostic ultrasound system for suppressing flash signals, the system comprising:
a parameter processor operative (1) to determine differences between each two consecutive parameter values of a plurality of sequential parameter values representing a spatial location, each parameter value of the plurality of sequential parameter values representing the spatial location at a different time and (2) to compare the differences to a threshold; and
a switch responsive to the parameter processor to replace at least one of (1) a second parameter value of the plurality of sequential parameter values with a first parameter value of the plurality of sequential parameter values and (2) a second value of another type of parameter with a first value of the other type of parameter, the first and second values of the other type of parameter representing the spatial location at different times, when a difference between the first and second parameter values crosses the threshold.

20. The system of claim 19 wherein the plurality of sequential parameter values comprise energy values.

21. The system 19 wherein the parameter processor is operable to compare a second type of parameter value representing the spatial location to a second threshold; and
replacement by the switch occurs when the second type of parameter is one of greater than and less than the second threshold.

22. The system of claim 21 wherein the parameter processor is operable to compare a third type of parameter value representing the spatial location to a third threshold;
replacement by the switch occurs when the third type of parameter is one of greater than and less than the third threshold.

23. The system of claim 19 wherein the parameter processor and switch are operable to replace parameters values subsequent to the second parameter value with the first parameter value until a difference between two subsequent parameter values is less than a second threshold.

24. The system of claim 19 wherein the parameter processor and switch are operable to replace parameter values subsequent to the second parameter value with the first parameter until a number, N, of consecutive parameter values have been replaced.

25. The system of claim 19 wherein the parameter processor and switch are operable to replace the second parameter value with the first parameter value.

26. The system of claim 19 wherein the parameter processor and switch are operable to replace the first value of the other type of parameter with the second value of the other type of parameter.

27. A medical diagnostic ultrasound method of suppressing flash signals, the method comprising the acts of:
(a) replacing one of (1) a second parameter value representing a spatial location with a first parameter value representing the spatial location at a different time and (2) another parameter value representing the spatial location at a same time as the second parameter value with another parameter value representing the spatial location at a same time as the first parameter value when a first difference is greater than the first threshold; and
(b) replacing parameters subsequent to the second parameter with at least one of (1) the first parameter value and (2) the other parameter value representing the spatial location at the same time as the first parameter value until a difference between two subsequent parameters is less than a second threshold.

28. The method of claim 27 wherein the first and second parameter values comprise energy values.

29. The method of claim 27 further comprising:
(c) comparing a second type of parameter value representing the spatial location to a third threshold;
wherein act (a) occurs when the second type of parameter value is one of greater than and less than the second threshold.

30. The method of claim 29 wherein the first and second parameter values comprise a first type of energy values and the second type of parameter comprises a second, different type of energy, act (a) occurring when the second type of energy is greater than the second threshold.

31. The method of claim 29 wherein the first and second parameter values comprise energy values and the second type of parameter comprises a variance parameter, act (a) occurring when the variance parameter is less than the threshold.

32. The method of claim 29 wherein the first and second parameter values comprise energy values and the second type of parameter comprises a velocity parameter, act (a) occurring when the velocity parameter is less than the threshold.

33. The method of claim 27 wherein act (a) comprises replacing both the second parameter value and the other parameter value representing the spatial location at the same time as the second parameter.

34. The method of claim 27 wherein the first and second parameter values comprise B-mode intensifies.

35. The method of claim 27 wherein act (a) comprises replacing the second parameter value with the first parameter value.

36. The method of claim 27 wherein act (a) comprises replacing the other parameter value representing the spatial location at the same time as the second parameter with the other parameter value representing the spatial location at the same time as the first parameter.

37. The method of claim 27 further comprising:
(c) determining the first difference as a difference between the first and second parameter values.

38. A medical diagnostic ultrasound system for suppressing flash signals, the system comprising:
a parameter processor operable to determine a first difference between a first parameter value representing a spatial location and a second parameter value representing the spatial location at a different time and to compare the first difference to a first threshold; and a switch operable to replace one of (1) the second parameter value with the first parameter value and (2) another parameter value representing the spatial location at a same time as the second parameter value with another parameter value representing the spatial location at a same time as the first parameter value when the first difference is greater than the first threshold;

wherein parameters subsequent to the second parameter are replaced with one of (1) the first parameter value and (2) the other parameter value representing the spatial location at the same time as the first parameter value until a difference between two subsequent parameters is less than a second threshold.

39. The system of claim 38 wherein the first and second parameter values comprise energy values.

40. The system of claim 38 wherein the parameter processor and switch are operable to compare a second type of parameter value representing the spatial location to a second threshold;

wherein replacement at the time of the second parameter value occurs when the second type of parameter value is one of greater than and less than the second threshold.

41. The system of claim 38 wherein the parameter processor and switch are operable to replace both the second parameter value and the other parameter value representing the spatial location at the same time as the second parameter.

42. The system of claim 38 wherein the parameter processor and switch are operable to replace the second parameter value with the first parameter value.

43. The system of claim 38 wherein the parameter processor and switch are operable to replace the other parameter value representing the spatial location at the same time as the second parameter with the other parameter value representing the spatial location at the same time as the first parameter.

44. A medical diagnostic ultrasound method of suppressing flash signals, the method comprising the acts of:

(a) determining a first difference between a first parameter value representing a spatial location and a second parameter value representing the spatial location at a different time;

(b) comparing the first difference to a first threshold;

(c) comparing another type of parameter value to a second threshold; and (d) replacing one of the second parameter value and the other type of parameter value when the first difference is greater than the first threshold and the other type of parameter value is one of greater than and less than the second threshold.

45. The method of claim 44 further comprising repeating acts (a), (b), and (c) for a plurality of sequential parameter values and performing act (d) when the first difference is greater than the first threshold and the other type of parameter value is one of greater than and less than the second threshold.

46. The method of claim 44 wherein the first and second parameter values comprise a first type of energy values and the other type of parameter value comprises a second, different type of energy, act (d) occurring when the second type of energy is greater than the second threshold.

47. The method of claim 44 wherein the first and second parameter values comprise energy values and the other type of parameter value comprises a variance parameter, act (d) occurring when the variance parameter is less than the second threshold.

48. The method of claim 44 wherein the first and second parameter values comprise energy values and the other type of parameter value comprises a velocity parameter, act (d) occurring when the velocity parameter is less than the second threshold.

49. The method of claim 44 further comprising:

(e) comparing a second other type of parameter value representing the spatial location to a third threshold;

wherein act (d) occurs when the second other type of parameter value is one of greater than and less than the third threshold.

50. The method of claim 44 wherein act (d) comprises replacing the second parameter value, the other type of parameter value and combinations thereof.

51. The method of claim 44 further comprising:

(e) replacing parameters values subsequent to the second parameter value with the first parameter value until a difference between two subsequent parameter values is less than a third threshold.

52. The method of claim 44 further comprising:

(e) replacing parameter values subsequent to the second parameter value with the first parameter until a number, N, of consecutive parameter values have been replaced.

53. The method of claim 44 wherein the first and second parameter values comprise B-mode intensities.

54. The method of claim 44 wherein act (d) comprises replacing the second parameter value with the first parameter value.

55. The method of claim 44 wherein act (d) comprises replacing the other type of parameter value with an earlier one of the other type of parameter value.

56. A medical diagnostic ultrasound system for suppressing flash signals, the system comprising:

a parameter processor operable to determine a first difference between a first parameter value representing a spatial location and a second parameter value representing the spatial location at a different time, to compare a third parameter value the first difference to a first threshold, and to compare, to a second threshold, the third parameter value comprising another type of parameter; and a switch operable to replace at least one of the second parameter value and the third of parameter value when the first difference is greater than the first threshold and the third parameter value is one of greater than and less than the second threshold.

57. The system of claim 56 wherein the parameter processor and the switch are operable to determine the difference and both comparisons for a plurality of sequential parameter values and replace when the first difference is greater than the first threshold and the third parameter value is one of greater than and less than the second threshold.

58. The system of claim 56 wherein the first and second parameter values comprise a first type of energy values and the third parameter value comprises a second, different type of energy, replacement occurring when the second type of energy is greater than the second threshold.

59. The system of claim 56 wherein the first and second parameter values comprise energy values and the third parameter value comprises a variance parameter, replacement occurring when the variance parameter is less than the second threshold.

60. The system of claim 56 wherein the first and second parameter values comprise energy values and the third parameter value comprises a velocity parameter, replacement occurring when the velocity parameter is less than the second threshold.

61. The system of claim 56 wherein the switch is operable to replace the second parameter value and the third parameter value.

62. The system of claim 56 wherein the parameter processor and switch are operable to replace parameters values subsequent to the second parameter value with the first parameter value until a difference between two subsequent parameter values is less than a third threshold.

63. The system of claim 62 wherein the parameter processor and switch are operable to replace parameter values subsequent to the second parameter value with the first parameter until a number, N, of consecutive parameter values have been replaced.

64. The system of claim 56 wherein the switch is operable to replace the second parameter value with the first parameter value.

65. The system of claim 56 wherein the switch is operable to replace the third parameter value with an third other type of parameter value.

66. A medical diagnostic ultrasound method of suppressing flash signals, the method comprising the acts of:

(a) estimating a plurality of parameter values representing a spatial location at different times;

(b) determining differences between a first parameter value of the plurality of parameter values and a second parameter value of the plurality of parameter values without comparison of the first and second parameter values;

(c) comparing the difference to a threshold; and (d) replacing at least one of (1) the second parameter value with the first parameter value and (2) a second value of another type of parameter with a first value of the other type of parameter, the first and second values of the other type of parameter representing the spatial location at different times, when the difference between the first and second parameter values crosses the threshold.

* * * * *

UNITED STATES PATENT AND TRADEMARK OFFICE
CERTIFICATE OF CORRECTION

PATENT NO. : 6,287,258 B1
DATED : September 11, 2001
INVENTOR(S) : Patrick J. Phillips It is certified that error appears in the above-identified patent and that said Letters Patent is hereby corrected as shown below:

Column 13,
Line 20, delete "less that" and substitute -- less than -- in its place.

Column 14,
Line 51, delete "intensifies" and substitute -- intensities -- in its place.

Column 16,
Line 41, delete "a third parameter value"; and
Line 42, after "compare" insert -- a third parameter value --.

Column 17,
Lines 21-22, delete "third other type of" and substitute -- earlier one of the third -- in its place.

Signed and Sealed this

Fifth Day of November, 2002

*Attest:*

JAMES E. ROGAN
*Director of the United States Patent and Trademark Office*

*Attesting Officer*